US011987050B2

(12) United States Patent
Murata

(10) Patent No.: US 11,987,050 B2
(45) Date of Patent: May 21, 2024

(54) DROPLET EJECTION DEVICE AND DROPLET EJECTION METHOD

(71) Applicant: SIJTechnology, Inc., Tsukuba (JP)

(72) Inventor: Kazuhiro Murata, Tsukuba (JP)

(73) Assignee: SIJTechnology, Inc., Tsukuba (JP)

( * ) Notice: Subject to any disclaimer, the term of this patent is extended or adjusted under 35 U.S.C. 154(b) by 190 days.

(21) Appl. No.: 17/703,763

(22) Filed: Mar. 24, 2022

(65) Prior Publication Data

US 2022/0212466 A1 Jul. 7, 2022

Related U.S. Application Data

(63) Continuation of application No. PCT/JP2020/034657, filed on Sep. 14, 2020.

(30) Foreign Application Priority Data

Oct. 2, 2019 (JP) ................................ 2019-182502

(51) Int. Cl.

| | |
|---|---|
| ***B41J 2/045*** | (2006.01) |
| ***B41J 2/145*** | (2006.01) |
| *B41J 29/393* | (2006.01) |

(52) U.S. Cl.

CPC ......... *B41J 2/04593* (2013.01); *B41J 2/0451* (2013.01); *B41J 2/145* (2013.01); *B41J 29/393* (2013.01)

(58) Field of Classification Search

CPC ....... B41J 2/045; B41J 2/21; B41J 2/01; B41J 2/165; B41J 2/355; B41J 29/393;

(Continued)

(56) References Cited

U.S. PATENT DOCUMENTS

2001/0052738 A1 12/2001 Kitahara
2004/0104951 A1* 6/2004 Shibata .................. B41J 2/2139 347/14

(Continued)

FOREIGN PATENT DOCUMENTS

CN 101396906 A 4/2009
CN 102248786 A 11/2011

(Continued)

OTHER PUBLICATIONS

Extended European Search Report received from the Hague Patent Office in related Application No. 20871768.6-1014 / 4039477 PCT/JP2020/034657 dated Sep. 18, 2023.

(Continued)

*Primary Examiner* — John Zimmermann
(74) *Attorney, Agent, or Firm* — THE MARBURY LAW GROUP, PLLC

(57) ABSTRACT

A droplet ejection device includes a processor; and a memory device configured to store a program, the program executed by the processor to cause the processor to: acquire information of a droplet ejection unit including a plurality of nozzles, the plurality of nozzles moving in a first direction toward an object and ejecting a droplet; and set ejection conditions of the droplet in each of the plurality of nozzles based on the acquired information of the droplet ejection unit. The droplet ejection device further may include an inspection unit configured to inspect the nozzle. The information of the nozzle may include information of a shape in a tip of the nozzle. It is possible to eject a droplet in a stable and consistent manner at a predetermined position by using one embodiment of the present disclosure.

16 Claims, 13 Drawing Sheets

(58) Field of Classification Search
CPC ....... B41J 25/00; B41J 2/14; B41J 2/15; B41J 2/145; B41J 29/38; G06K 15/00
See application file for complete search history.

(56) References Cited

U.S. PATENT DOCUMENTS

| | | | |
|---|---|---|---|
| 2007/0064042 | A1 | 3/2007 | Sugahara |
| 2008/0117467 | A1 | 5/2008 | Hosaka et al. |
| 2009/0085957 | A1 | 4/2009 | Fujimori |
| 2011/0285771 | A1 | 11/2011 | Shinkawa |
| 2017/0106646 | A1 | 4/2017 | Anderson et al. |
| 2018/0104951 | A1* | 4/2018 | Kaburagi ............ B41J 2/04573 |

FOREIGN PATENT DOCUMENTS

| | | | |
|---|---|---|---|
| EP | 1 924 078 | A2 | 5/2008 |
| JP | 10-34967 | A | 2/1998 |
| JP | H10-67113 | A | 3/1998 |
| JP | 11-221911 | A | 8/1999 |
| JP | 2001-277525 | A | 10/2001 |
| JP | 2003-276218 | A | 9/2003 |
| JP | 2007-112125 | A | 5/2007 |
| JP | 2008-126453 | A | 6/2008 |
| JP | 2008-221183 | A | 9/2008 |
| JP | 2009-030977 | A | 2/2009 |
| JP | 2009-226741 | A | 10/2009 |
| JP | 2015-061744 | A | 4/2015 |
| JP | 2016-112554 | A | 6/2016 |
| JP | 2017-074723 | A | 4/2017 |
| JP | 2018-56819 | A | 4/2018 |

OTHER PUBLICATIONS

Notice of Reasons for Refusal received in related Japanese Patent Application No. 2019-182502 dated May 9, 2023.
1st Office Action issued in related Korean Patent Application No. 10-2022-7008225 dated Nov. 20, 2023.
Japan Patent Office, Written Opinion of the International Searching Authority issued in International Application No. PCT/JP2020/034657, English-language translation, mailed Dec. 8, 2020 (6 pages).
Notice of Allowance for corresponding Japanese Patent Application No. 2019-182502 dated Oct. 17, 2023.
Japan Patent Office, International Search Report in International Application No. PCT/JP2020/034657, including English-language translation, mailed Dec. 8, 2020 (12 pages).
Taiwan Advance Patent & Trademark Office, Examination Statement in Taiwan Patent Application No. 109133745, including English-language translation, dated May 31, 2021 (13 pages).
Office Action issued in related Chinese Patent Application No. 202080064103.8 dated Mar. 17, 2023.
Notice of Allowance dated Jan. 2, 2024 issued in related Chinese Application No. 202080064103.8. [CN-NOA].

* cited by examiner

DROPLET EJECTION DEVICE AND DROPLET EJECTION METHOD

CROSS REFERENCE TO RELATED APPLICATIONS

This application is a U.S. continuation application filed under 35 U.S.C. § 111(a), of International Application No. PCT/JP2020/034657, filed on Sep. 14, 2020, which claims priority to Japanese Patent Application No. 2019-182502, filed on Oct. 2, 2019, the disclosures of which are incorporated herein by reference.

FIELD

The present disclosure relates to a droplet ejection device and a droplet ejection method.

BACKGROUND

In recent years, inkjet printing technology has been applied to industrial processes. For example, a color filter manufacturing process for a liquid crystal display is an example. Although a so-called piezo type head, which ejects a droplet by mechanical pressure or vibration, has been conventionally used as inkjet printing technology, an electrostatic ejection-type inkjet head, which can eject a finer droplet, is attracting attention. Japanese Laid Open Patent No. H10-34967 discloses an electrostatic ejection-type inkjet recording device.

SUMMARY

According to an embodiment of the present disclosure, a droplet ejection device includes a processor and a memory device configured to store a program, the program executed by the processor to cause the processor to acquire information of a droplet ejection unit including a plurality of nozzles, the plurality of nozzles moving in a first direction toward an object and ejecting a droplet and set ejection conditions of the droplet in each of the plurality of nozzles based on the acquired information of the droplet ejection unit.

The droplet ejection device may further include an inspection unit configured to inspect a shape of the nozzles provided in the droplet ejection unit, and the information of the droplet ejection unit may include information of an opening of the nozzle.

The droplet ejection device may further include an inspection unit configured to inspect a shape of the droplet ejected from the nozzles provided in the droplet ejection unit, and the information of the droplet ejection unit may include the information associated with the shape of the ejected droplet.

In the droplet ejection device, the droplet ejection unit may include a first nozzle ejecting a first droplet and a second nozzle ejecting a second droplet, the second nozzle being arranged adjacent to the first nozzle in a second direction intersecting the first direction, and the first nozzle and the second nozzle may be arranged on a structure extending in the second direction.

In the droplet ejection device, the program may cause the processor to set a time to start ejecting the second droplet from the second nozzle earlier than a time to start ejecting the first droplet from the first nozzle when a center of an opening of the second nozzle is arranged further in the first direction than a center of an opening of the first nozzle.

In the droplet ejection device, the program may cause the processor to set a time to eject the second droplet from the second nozzle longer than a time to eject the first droplet from the first nozzle when an opening of the second nozzle is smaller than an opening of the first nozzle.

In the droplet ejection device, the program may cause the processor to set a time to start ejecting the second droplet from the second nozzle after an ending time of ejecting the first droplet from the first nozzle when a center of an opening of the second nozzle is arranged further in the second direction than a center of an opening of the first nozzle.

The droplet ejection device may include a second droplet ejection unit different from the droplet ejection unit, and the second droplet ejection unit may eject a droplet based on the information of the droplet ejection unit.

According to an embodiment of the present disclosure, there is provided a droplet ejection method configured to inspect a droplet ejection unit, the droplet ejection unit moving in a first direction toward an object, acquire information of the inspected droplet ejection unit, and set ejection conditions of the droplet based on the acquired information of the droplet ejection unit.

In the droplet ejection method, the information of the inspected droplet ejection unit may include information of an opening of a nozzle provided in the droplet ejection unit.

In the droplet ejection method, the information of the inspected droplet ejection unit may include information associated with the shape of the droplet ejected from a nozzle provided in the droplet ejection unit.

In the droplet ejection method, a plurality of nozzles provided in the droplet injection unit includes a first nozzle ejecting a first droplet and a second nozzle ejecting a second droplet, the second nozzle being arranged adjacent to the first nozzle in a second direction intersecting the first direction, and the first nozzle and the second nozzle are arranged on a structure extending in the second direction.

The droplet ejection method may set a time to start ejecting the second droplet from the second nozzle earlier than a time to start ejecting the first droplet from the first nozzle when a center of an opening of the second nozzle is arranged further in the first direction than a center of an opening of the first nozzle.

The droplet ejection method may set a time to eject the second droplet from the second nozzle longer than a time to eject the first droplet from the first nozzle when an opening of the second nozzle is smaller than an opening of the first nozzle.

The droplet ejection method may set a time to start ejecting the second droplet from the second nozzle after an ending time of ejecting the first droplet from the first nozzle when a center of an opening of the second nozzle is arranged further in the second direction than a center of an opening of the first nozzle.

By using an embodiment of the present disclosure, it is possible to eject a droplet to an object which is stable at a predetermined position.

DESCRIPTION OF EMBODIMENTS

Figure 1:
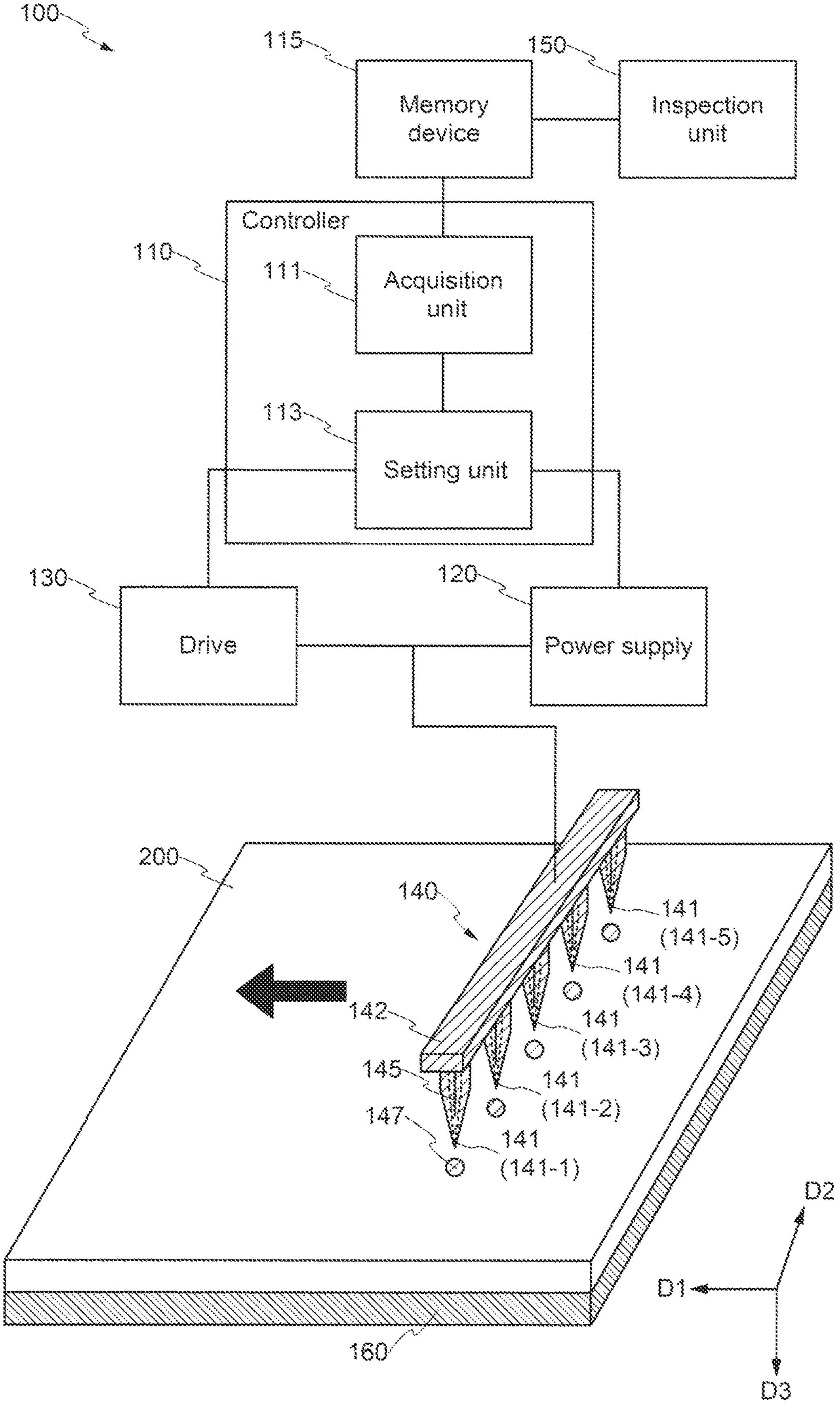
FIG. 1 is a schematic view of a droplet ejection device according to an embodiment of the present disclosure.

Hereinafter, embodiments of the present disclosure disclosed in the present application will be described with reference to the drawings. However, the present disclosure can be implemented in various forms without departing from the gist thereof and should not be construed as being limited to the description of the embodiments exemplified below.

In the drawings referred to in the present embodiments, the same portions or portions having similar functions are denoted by the same symbols or similar symbols (symbols each formed simply by adding A, B, etc. to the end of a number), and a repetitive description thereof may be omitted. In addition, the dimensional ratio in the drawings may be different from the actual ratio for convenience of description, or a part of a configuration may be omitted from the drawings.

Furthermore, in the detailed description of the present disclosure, in defining the positional relationship between one component and another, the terms “above” and “below” include not only the case of being positioned directly above or below one component, but also the case of interposing another component therebetween, unless otherwise specified.

It may not be possible to eject at a predetermined position using the electrostatic ejection-type ink jet head depending on the shape of the tip of a nozzle.

Therefore, one object of the present disclosure is to eject a droplet to an object which is stable at a predetermined position.

First Embodiment

1-1. Configuration of Droplet Ejection Device 100

FIG. 1 is a schematic view of a droplet ejection device 100 according to an embodiment of the present disclosure.

The droplet ejection device 100 includes a controller 110, a memory device 115, a power supply 120, a drive 130, a droplet ejection unit 140, an inspection unit 150, and an object holding unit 160.

The controller 110 includes a CPU (Central Processing Unit), an ASIC (Application Specific Integrated Circuit), an FPGA (Field Programmable Gate Array), or other calculation processing circuits. The controller 110 controls ejection processing of the droplet ejection unit 140 by using a pre-set droplet ejection program.

The memory device 115 has a function as a database for storing a droplet ejecting program and various types of data used in the droplet ejecting program. A memory, an HDD (Hard Disk Drive), an SSD (Solid State Drive), or other memory elements are used for the memory device 115.

The power supply 120 is connected to the controller 110, the drive 130, and the droplet ejection unit 140. The power supply 120 applies a voltage to the droplet ejection unit 140 based on a signal input from the controller 110. In this example, the power supply 120 applies a pulsed voltage to the droplet ejection unit 140 in a fixed period. The voltage is not limited to the pulse voltage, and a constant voltage may be applied at all times.

The drive 130 is composed of drive members such as a motor, a belt, and a gear. The drive 130 moves the droplet ejection unit 140 (more specifically, a nozzle 141 to be described later) in one direction (in this example, first direction D1) relative to an object 200 based on an instruction from the controller 110.

The droplet ejection unit 140 ejects a droplet 147 to the object 200. In this example, the droplet 147 is ejected from a perpendicular direction D3 to the object 200. The droplet ejection unit 140 includes a nozzle 141 and an ink tank (not shown). An electrostatic ejection-type ink jet nozzle is used for the nozzle 141. Therefore, it can be said that the droplet ejection unit 140 is an electrostatic ejection-type ink jet head.

Figure 2A:
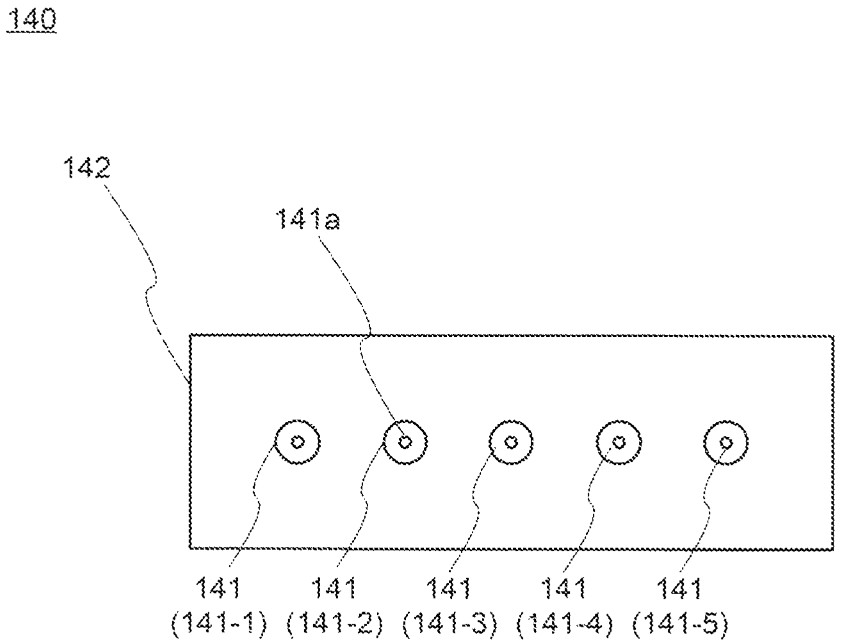
FIG. 2A is a plan view of a droplet ejection unit of an opening of a nozzle according to an embodiment of the present disclosure.
Figure 2B:
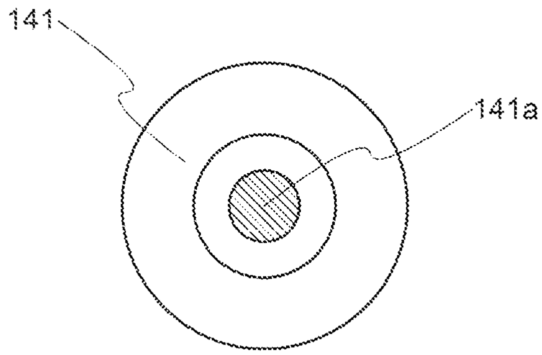
FIG. 2B is an enlarged view of an opening of a nozzle according to an embodiment of the present disclosure.

FIG. 2A is a plan view of the droplet ejection unit 140. FIG. 2B is an enlarged view of the nozzle 141. In this example, the droplet ejection unit 140 includes a plurality of nozzles 141 (nozzles 141-1, 141-2, 141-3, 141-4, and 141-5) and a structure 142. The nozzle 141-1, the nozzle 141-2, the nozzle 141-3, the nozzle 141-4, and the nozzle 141-5 are arranged at equal intervals in the structure 142, respectively. The nozzle 141 may be welded to the structure 142 or may be fixed by an adhesive. The nozzle 141-1, the nozzle 141-2, the nozzle 141-3, the nozzle 141-4, and the nozzle 141-5 will be described as the nozzle 141 unless otherwise limited.

Returning to FIG. 1, the structure 142 extends in a second direction D2 intersecting (in this example, orthogonal to) the direction (the first direction D1) in which the droplet ejection unit 140 is scanned. Therefore, it can be said that the plurality of nozzles 141 is aligned in the second direction D2. The structure 142 is provided in a plate shape in this example. The structure 142 includes a flow path for each nozzle 141 so that a liquid stored in the ink tank is ejected as the droplet 147 from each nozzle 141. The structure 142 may be appropriately formed into an optimum shape according to the application. As shown in FIG. 2A and FIG. 2B, it is desirable that an inner diameter of an opening 141*a* at the tip of the nozzle 141 is several hundred nm or more and 20 μm or less, preferably 1 μm or more and 15 μm or less, more preferably 5 μm or more and 12 μm or less.

The nozzle 141 has a glass tube, and an electrode 145 is provided inside the glass tube. In this example, a fine wire formed of tungsten is used as the electrode 145. The electrode 145 is not limited to tungsten, and nickel, molybdenum, titanium, gold, silver, copper, platinum, or the like may be provided for the electrode 145.

The electrode 145 of the nozzle 141 is electrically connected to the power supply 120. The liquid (ink) stored in the ink tank is ejected from the opening 141*a* of the nozzle 141 as the droplet 147 by a voltage (in this example, 1000 V) applied from the power supply 120 to the inside of the nozzle 141 and the electrode 145. The shape of the droplet (pattern) formed by the droplet 147 is controlled by the voltage applied from the power supply 120.

A material having a high viscosity is used for the droplet 147. Specifically, an ink for forming a pattern containing a pigment is used for the droplet 147. The droplet 147 may include a conductive particle. The droplet ejection unit 140 is provided with an electrostatic ejection-type ink jet, and the ejection amount is controlled by a voltage applied from the power supply 120. It is desirable that the ejection amount of the droplet 147 is 0.1 fl or more and 100 pl or less. The pattern size formed in this case is 100 nm or more and 500 μm or less.

The inspection unit 150 inspects the shapes of the opening 141*a* of each nozzle 141. In this case, an optical microscope, which includes an optical element such as a lens, a display device such as a display and an imaging element, is used for the inspection unit 150. The nozzle 141 to be inspected is arranged to face the optical microscope. The inspection unit 150 captures an image of the nozzle 141 based on an image of the nozzle 141 having an opening formed in accordance with a design value previously stored in the memory device 115. Information of the opening 141*a* in the nozzle 141 inspected by the inspection unit 150 is stored in the memory device 115.

The object holding unit 160 has a function of holding the object 200. In this example, a stage is used as the object holding unit 160. A mechanism by which the object holding unit 160 holds the object 200 is not particularly limited, and a general holding mechanism is used. In this example, the object 200 is vacuum adsorbed on the object holding portion 160. Furthermore, the object holding unit 160 is not limited thereto and may hold the object 200 using a fixture.

The object 200 is a member on which the droplet 147 is ejected. In this example, a glass plate is used as the object 200. The object 200 is not limited to a glass plate. For example, the object 200 may be a metal plate or an organic resin member. A metal wiring or an organic member may be formed on the object 200. A counter electrode for the droplet ejection is provided on the object 200.

In the present embodiment, the controller 110 includes an acquisition unit 111 and a setting unit 113 as an internal configuration of software.

The acquisition unit 111 acquires information of the nozzle 141. In this example, information of the opening 141*a* at the tip of the nozzle 141 inspected by the inspection unit 150 is stored in the memory device 115. For this reason, the acquisition unit 111 acquires the information of the opening 141*a* at the tip of the nozzle 141 from the memory device 115. In this case, the acquisition unit 111 acquires information by receiving information of the opening 141*a* at the tip of the nozzle 141.

The setting unit 113 sets an ejection condition of the droplet 147 based on the information of the nozzle 141 acquired by the acquisition unit 111. In this example, the setting unit 113 corrects the pre-set ejection condition based on information such as a position of a center of the opening 141*a* in the nozzle 141 to be described later, the inner diameter of the opening 141*a*, and the like, and newly sets time to start ejecting, a time to end ejecting, and a voltage to be applied to the electrode 145 at the respective ejection positions of the object 200.

1-2. Droplet Ejection Method

Figure 3:
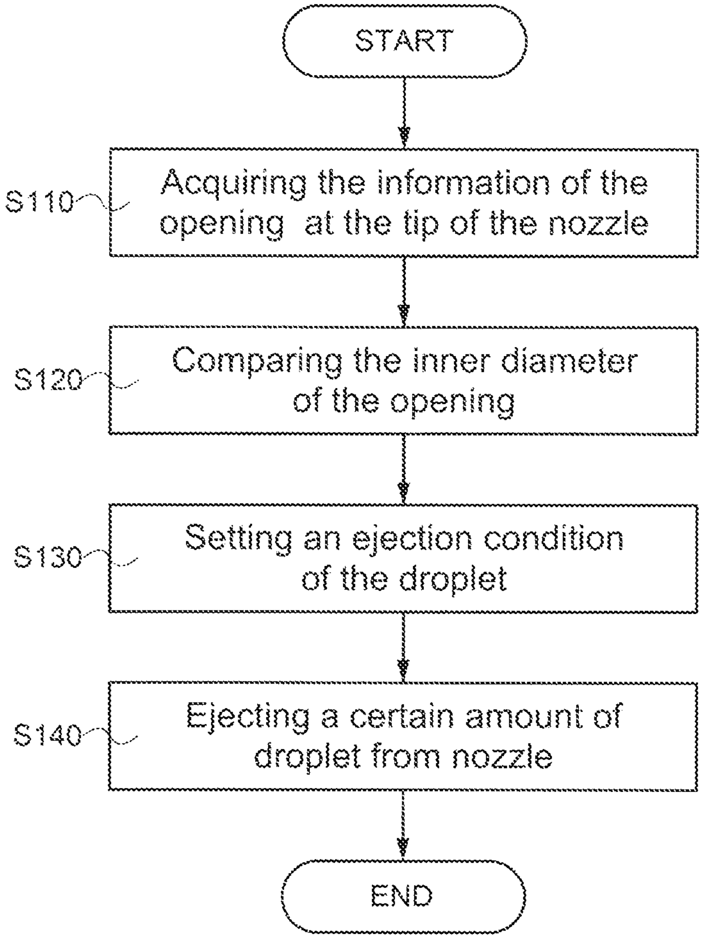
FIG. 3 is a flow diagram of a droplet ejection method according to an embodiment of the present disclosure.

Next, a droplet ejection method will be described with reference to the drawings. FIG. 3 is a flow diagram showing a droplet ejection method according to the present embodiment. Hereinafter, each case with a different opening is described.

1-2-1. Droplet Ejection Method in the Case where the Inner Diameter of the Opening is Different Hereinafter, a droplet ejection method is explained in the case where the inner diameter of the opening at the tip of the nozzle 141 is different. First, the acquisition unit 111 acquires the information of the opening 141*a* at the tip of the nozzle 141 (S110). The information of the opening 141*a* is inspected by the inspection unit 150 in advance. In this example, the nozzle is arranged at a predetermined position set for inspection. The tip of the nozzle 141 to be inspected is arranged facing the inspection unit 150 with a predetermined distance. The inspection unit 150 captures the opening 141*a* of each nozzle 141 based on the image of the nozzle 141 having the opening 141*a* formed according to the design value previously stored in the memory device 115. In this case, the image is captured so that a central portion of the nozzle 141 is at the center of the image. Therefore, in the case of the nozzle 141 having the opening 141*a* formed according to the design value, the center of the nozzle 141 overlaps the center of the opening 141*a*. The information of the opening 141*a* in the inspected nozzle 141 is stored in the memory device 115.

Figure 4A:
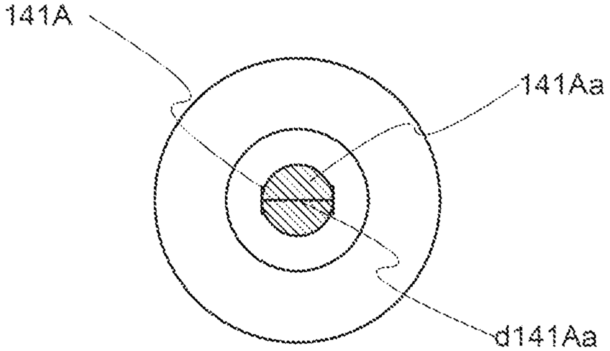
FIG. 4A is an enlarged view of an opening in a nozzle according to an embodiment of the present disclosure.
Figure 4B:
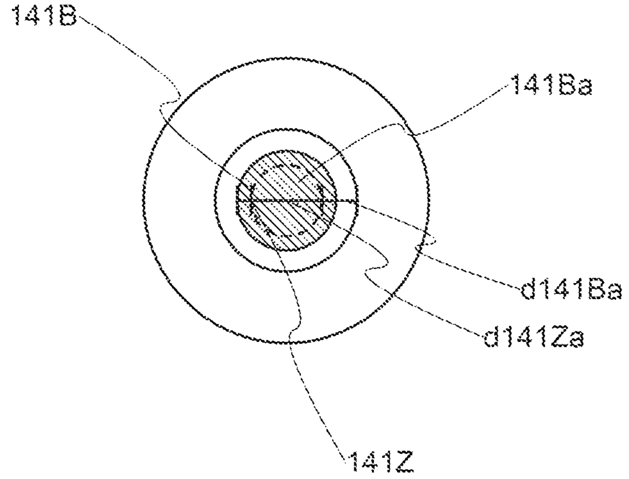
FIG. 4B is an enlarged view of an opening in a nozzle according to an embodiment of the present disclosure.
Figure 4C:
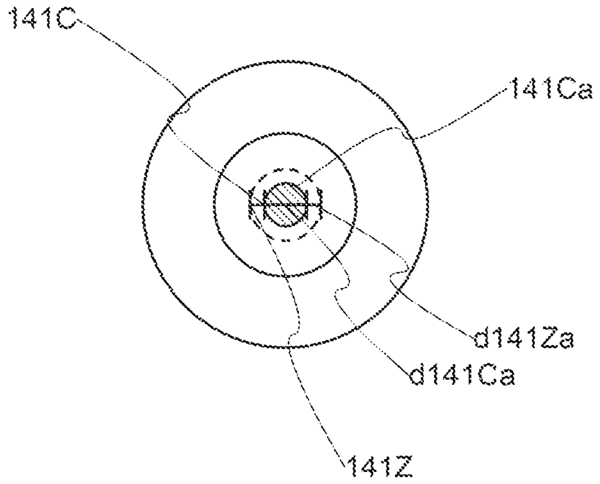
FIG. 4C is an enlarged view of an opening in a nozzle according to an embodiment of the present disclosure.

FIG. 4A, FIG. 4B and FIG. 4C are examples of the information of the inspected opening 141*a*. FIG. 4A is an enlarged view of the nozzle 141A. In FIG. 4A, an inner diameter d141Aa of an opening 141Aa is the same as a design value d141Za. FIG. 4B is an enlarged view of a nozzle 141B. In FIG. 4B, an inner diameter d141Ba of the opening 141Ba is larger than the design value d141Za. FIG. 4C is an enlarged view of a nozzle 141C. In FIG. 4C, an inner diameter d141Ca of an opening 141Ca is smaller than the design value d141Za.

Next, the setting unit 113 compares the inner diameter of the opening 141*a* acquired by the acquisition unit 111 with the design value (S120). In this case, the setting unit 113 calculates how much the opening 141*a* deviates from the design value. In this case, imaging processing may be appropriately performed using the image captured by the inspection unit 150.

Next, the setting unit 113 sets an ejection condition of the droplet 147 from the nozzle 141 by using the result calculated from the design value and the inner diameter of the opening 141*a*, which is inspected in the above description (S130). In this example, the setting unit 113 corrects the ejection condition of the droplet from the opening 141*a* formed with the pre-set design value, and newly sets the time to start ejecting the droplet 147, time to end ejecting the droplet 147, and the voltage to be applied to the electrode 145 at the respective ejection positions of the object 200.

Figure 5:
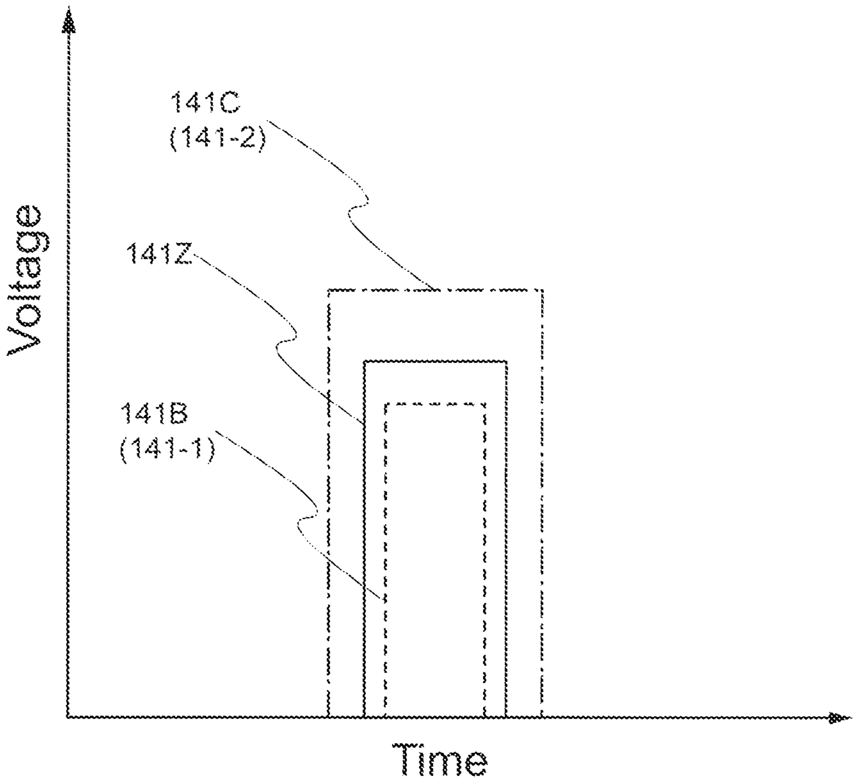
FIG. 5 is a schematic view showing a relationship between an ejection time and a voltage in a droplet ejection method according to an embodiment of the present disclosure.

FIG. 5 is a schematic view showing a relationship between a time to eject the droplet 147 and the voltage applied to the electrode 145 in the present embodiment. For example, the inner diameter of an opening 141-1*a* of the nozzle 141-1 among the nozzles 141 is larger than a nozzle 141Z formed with the design value (corresponding to the nozzle 141B), and the inner diameter of an opening 141-2*a* in the nozzle 141-2 is smaller than the nozzle 141Z formed with the design value (corresponding to the nozzle 141C). In this case, as shown in FIG. 5, the setting unit 113 sets the ejection condition so that the time to eject the droplet from the nozzle 141-2 is longer than the time to eject the droplet from the nozzle 141-1 (S130). In this case, the setting unit 113 may set the voltage applied to the electrode 145 of the nozzle 141-2 at the time of ejecting larger than the voltage applied to the electrode 145 of the nozzle 141-1 at the time of ejecting. The setting unit 113 sets the ejection condition for the other nozzles 141 in the same manner.

Finally, the nozzles 141 of the droplet ejection unit 140 are moved by the controller 110 and the drive 130 onto the object 200, which is prepared in the droplet ejection device 100. The droplet ejection unit 140 ejects a certain amount of droplets from each nozzle 141 based on the ejection condition set by the setting unit 113 (S140). As described above, even when the inner diameter of the opening 141*a* is different, the ejection condition is corrected for each nozzle 141 so as to achieve the optimum ejection condition, and the same amount of droplets can be ejected.

1-2-2. Droplet Ejection Method when the Opening Deviates in the Scanning Direction Next, a droplet ejection method is described in which the inner diameter of the opening 141*a* is the same but the opening 141*a* is deviated in the first direction D1, which is the moving direction of the droplet ejection unit 140. Descriptions similar to those described above are omitted as appropriate.

Figure 6A:
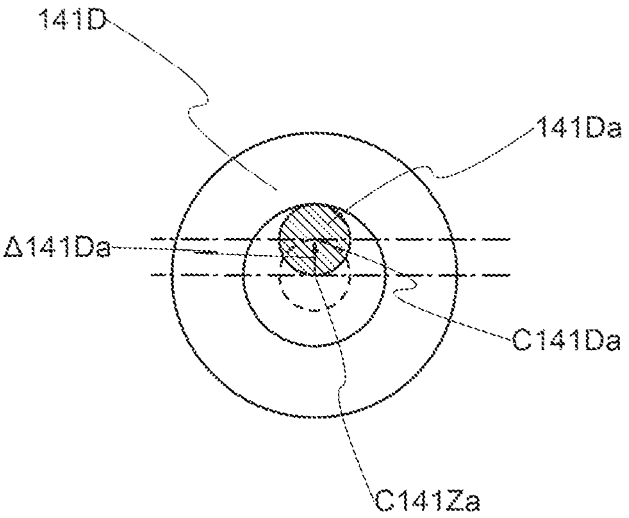
FIG. 6A is an enlarged view of an opening in a nozzle according to an embodiment of the present disclosure.
Figure 6B:
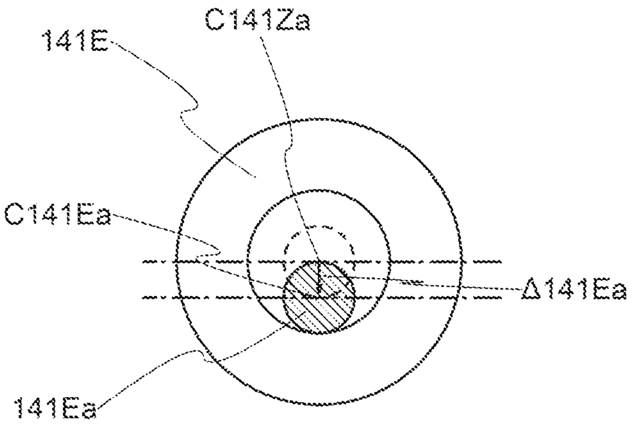
FIG. 6B is an enlarged view of an opening in a nozzle according to an embodiment of the present disclosure.
Figure 6B:
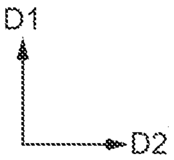

First, the acquisition unit 111 acquires the information of the opening 141*a* of the nozzle 141 (S110). FIG. 6A and FIG. 6B are examples of location information of the center in the inspected opening 141*a*. FIG. 6A is an enlarged view of the nozzle 141D. In FIG. 6A, a center position C141Da of an opening 141Da is deviated by Δ141 Da in the first direction D1 from a center C141Za of the design value. FIG. 6B is an enlarged view of a nozzle 141E. In FIG. 6B, a center C141Ea of an opening 141Ea is deviated by Δ141Ea in a direction opposite to the first direction D1 from the center position C141Za of the design value.

Next, the setting unit 113 compares the center position of the acquired opening 141*a* with the center position of the design value. In this case, the setting unit 113 calculates how much the center of the inspected opening 141*a* deviated from the center of the design value.

Next, the setting unit 113 sets the ejection condition of the droplet 147 from the nozzle 141 by using the result of the compared calculation from the location information of the center in the design value and the location information of the center in the opening 141*a*, which is inspected in the above description (S130). In this example, the setting unit 113 corrects the ejection condition in the opening 141*a* formed with the pre-set design value, and newly sets the time to start ejecting and the time to end ejecting at the respective ejection positions of the object 200.

Figure 7:
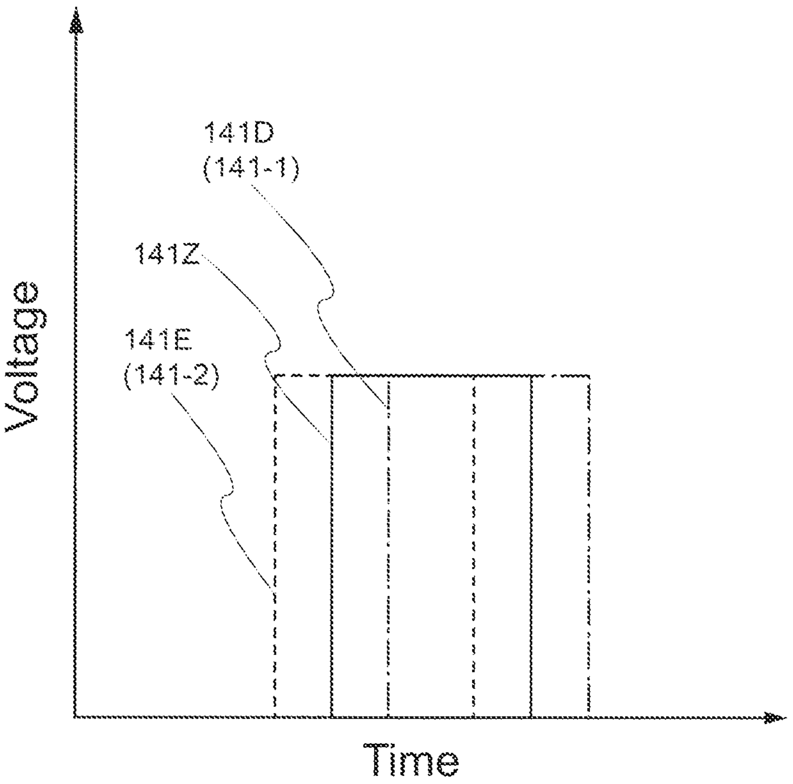
FIG. 7 is a schematic view showing a relationship between an ejection time and a voltage in a droplet ejection method according to an embodiment of the present disclosure.

FIG. 7 is a schematic view showing a relationship between a time to eject and a voltage in the present embodiment. For example, it is assumed that the center of the opening 141-1*a* in the nozzle 141-1 among the nozzles 141 is misaligned further in the direction opposite to the first direction D1 than the center of the opening in the nozzle 141Z formed with the design value (corresponding to the nozzle 141E), and that the center of the opening 141-2*a* of the nozzle 141-2 is misaligned further in the first direction D1 than the center of the opening of the nozzle 141Z formed with the design value (corresponding to a nozzle 141D). In this case, as shown in FIG. 7, the setting unit 113 sets the ejection condition so that a time to start ejecting from the nozzle 141-2 is earlier than a time to start ejecting from the nozzle 141-1 (S130). In this case, the setting unit 113 may keep the voltage applied to the electrode 145 of the nozzle 141-2 and the voltage applied to the electrode 145 of the nozzle 141-1 constant at the time of ejection. The setting unit 113 may set the variation amount in the position of the droplet ejection unit 140. Based on this information, the drive 130 can displace the position of the droplet ejection unit 140. The setting unit 113 may appropriately set the ejection condition for the other nozzles 141 in the same manner. In this example, in FIG. 7, the time of ejecting from each nozzle 141 partially overlaps.

Finally, the droplet ejection unit 140 ejects a certain amount of droplets from each nozzle 141 based on the ejection condition set by the setting unit 113 (S140). Thereby, even when the center of the opening 141*a* is shifted in the direction in which the droplet ejection unit 140 moves or in the opposite direction, a droplet at a predetermined position can be ejected.

In FIG. 7, although the time of ejecting from each nozzle 141 partially overlaps, it may not necessarily overlap.

1-2-3. Droplet Ejection Method when the Opening Deviates in the Direction Intersecting the Scanning Direction Next, a droplet ejection method is described in which the inner diameter of the opening 141*a* is the same but the center of the opening 141*a* is deviated in the direction (second direction D2) intersecting the moving direction (first direction D1) of the droplet ejection unit 140. Descriptions similar to those described above are omitted as appropriate.

Figure 8A:
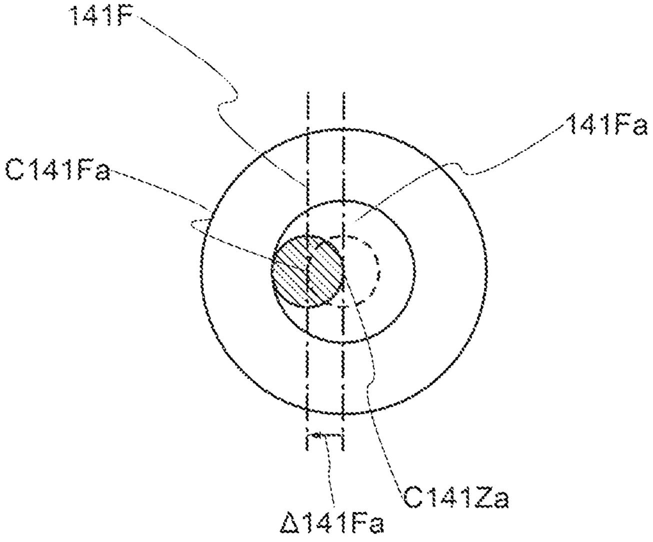
FIG. 8A is an enlarged view of an opening in a nozzle according to an embodiment of the present disclosure.
Figure 8B:
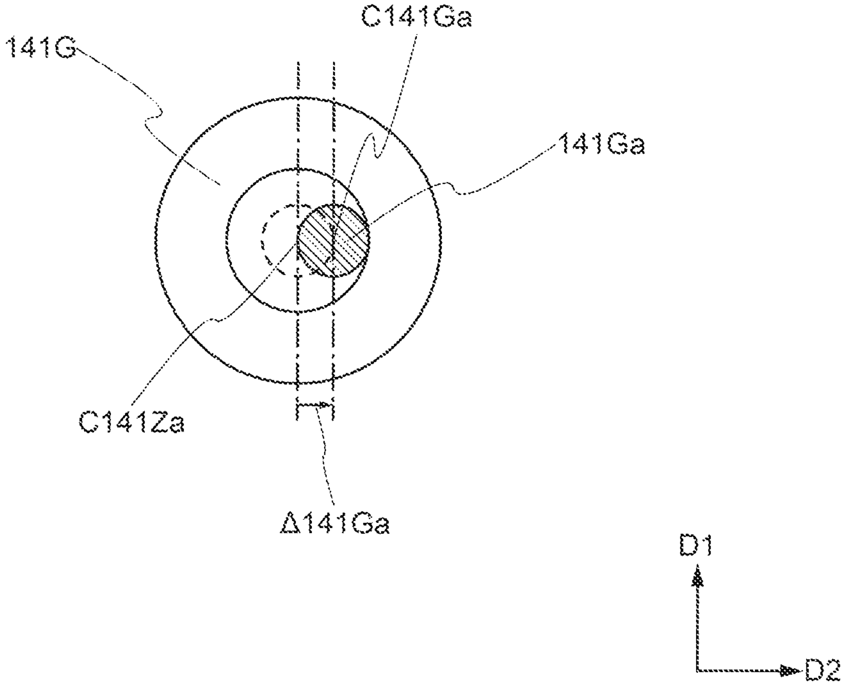
FIG. 8B is an enlarged view of an opening in a nozzle according to an embodiment of the present disclosure.

First, the acquisition unit 111 acquires the information of the opening 141*a* of the nozzle 141 (S110). FIG. 8A and FIG. 8B are examples of location information of the center of the inspected opening 141*a*. FIG. 8A is an enlarged view of a nozzle 141F. In FIG. 8A, a center position C141Fa of an opening 141Fa is deviated further in the direction opposite to the second direction D2 than the center position C141Za of the design value. FIG. 8B is an enlarged view of a nozzle 141G. In FIG. 8B, a center C141Ga of an opening 141Ga is deviated further in the second direction D2 than the center C141Za of the design value.

Next, the setting unit 113 compares the center position of the acquired opening 141*a* with the center position of the design value. In this case, the setting unit 113 calculates how much the center of the inspected opening 141*a* is deviated from the center of the design value.

Next, the setting unit 113 sets the ejection condition of the nozzle 141 by using the result calculated from the location information of the center of the design value and the location information of the center in the opening 141*a*, which is inspected in the above description (S130). In this example, the setting unit 113 corrects the ejection condition in the opening 141*a* formed with the pre-set design value and newly sets the time to start ejecting and the time to end ejecting the droplet 147 at the respective ejection positions of the object 200.

Figure 9:
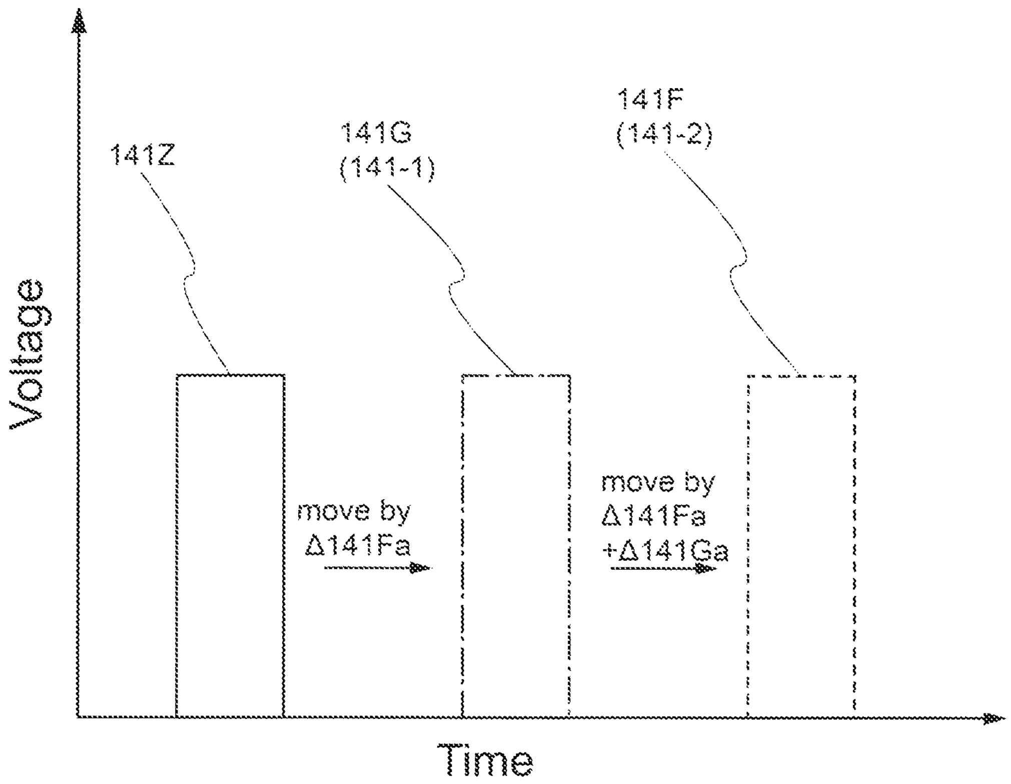
FIG. 9 is a schematic view showing a relationship between an ejection time and a voltage of a droplet ejection method according to an embodiment of the present disclosure.

FIG. 9 is a schematic view showing the relationship between the time of ejecting the droplet 147 and the voltage applied to the electrode 145 in the present embodiment. For example, it is assumed that the center of the opening 141-1*a* at the tip of the nozzle 141-1 among the nozzles 141 is arranged further in the second direction D2 than the center C141Za of the opening at the tip of the nozzle 141Z formed with the design value (corresponding to the nozzle 141G), and the center of the opening 141-2*a* of the nozzle 141-2 is arranged further in the direction opposite to the second direction D2 than the center C141Za at the tip of the nozzle 141Z formed with the design value (corresponding to the nozzle 141F). In this case, as shown in FIG. 9, the setting unit 113 sets the ejection condition so that a time to start ejecting from the nozzle 141-2 is later than a time to end ejecting from the nozzle 141-1 (S130). In addition, in this case, the setting unit 113 sets a variation amount of the position of the droplet ejection unit 140. Based on this information the drive 130 can shift the position of the droplet ejection unit 140. Specifically, the position of the nozzle 141 is moved by Δ141Ga by the drive 130 before the droplet ejection from the nozzle 141-1. Next, after the ejection from the nozzle 141-1, the ejection condition is set so that the position of the nozzle 141 is deviated by the sum of Δ141Fa and Δ141Ga by the drive 130, and the nozzle 141-2 ejects a droplet. In this case, the setting unit 113 may keep the voltage applied to the electrode 145 of the nozzle 141-2 and the voltage applied to the electrode 145 of the nozzle 141-1 constant at the time of ejection. The setting unit 113 set the ejection condition for the other nozzles 141 in the same manner.

Finally, the droplet ejection unit 140 ejects a certain amount of droplets from each nozzle 141 based on the ejection condition set by the setting unit 113 (S140). Thereby, even when the center of the opening 141*a* is deviated in the direction intersecting the scanning direction or in the direction opposite to the scanning direction, a droplet at a predetermined position can be ejected.

1-3. Pattern Shape After Ejection

Figure 10:
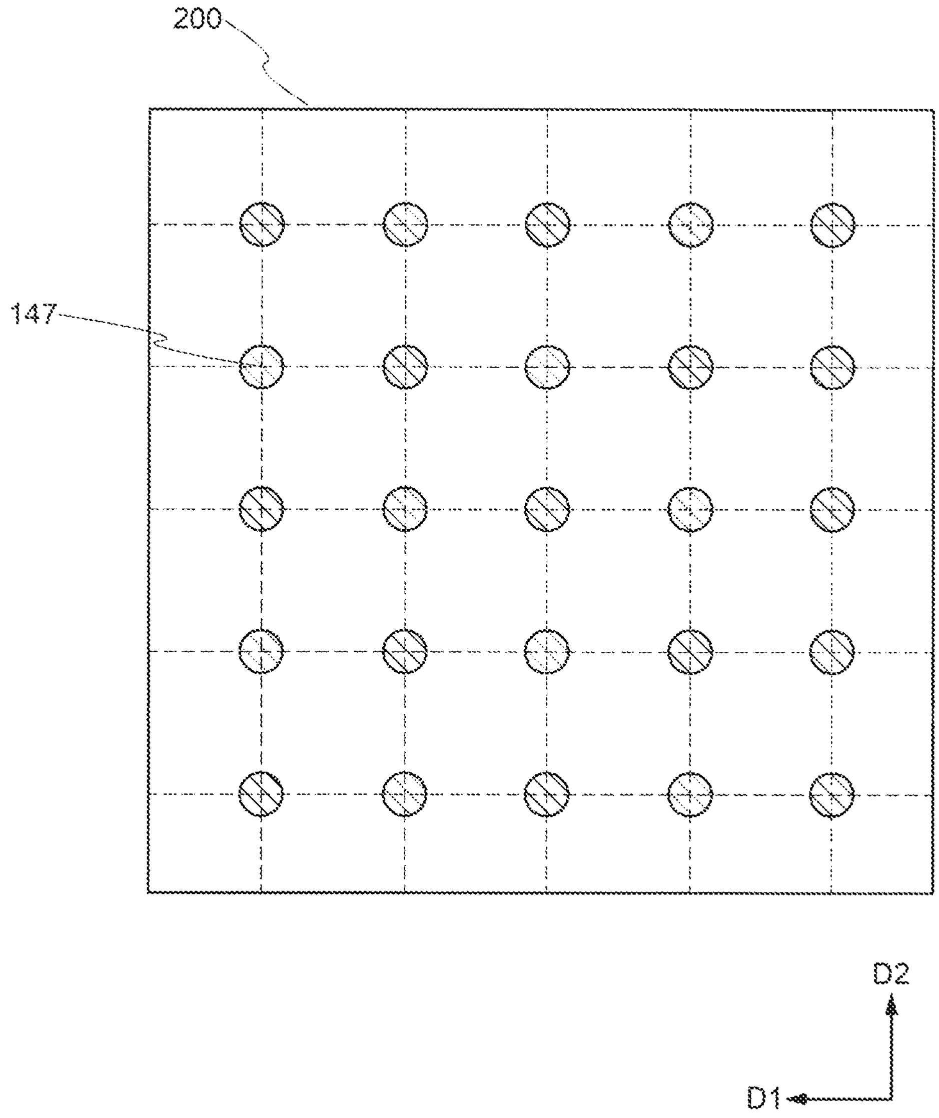
FIG. 10 is a top view of a pattern formed by a droplet ejection method according to an embodiment of the present disclosure.
Figure 13:
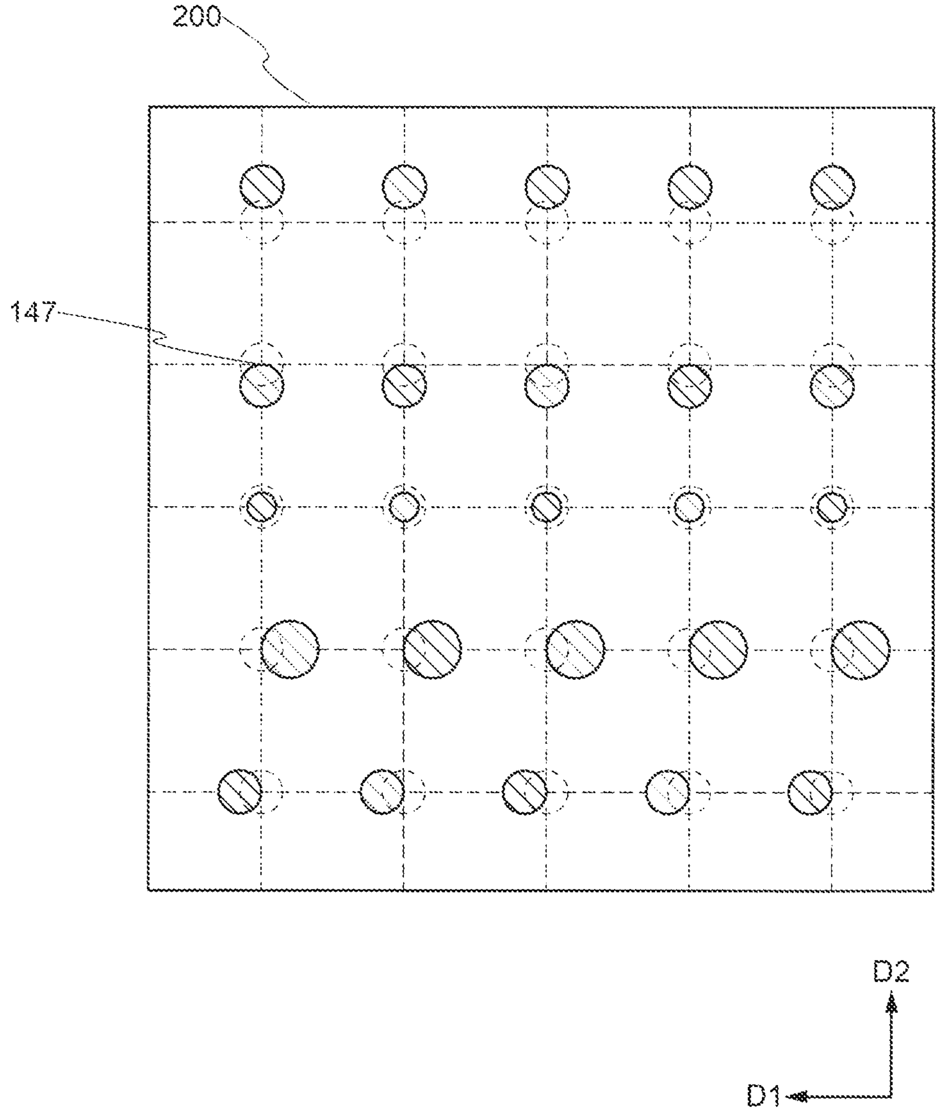
FIG. 13 is a top view of a pattern formed without correcting a droplet ejection condition.

A plan view of the object 200 after the droplet ejection is shown in FIG. 10. A plan view of the object 200 after the droplet ejection in the case where the droplet ejection condition is not corrected is shown in FIG. 13 as a comparative example. As shown in FIG. 13, in the case where the droplet ejection condition is not corrected, the ejection position of the droplet may be deviated, or the ejection amount of the droplet may be insufficient. On the other hand, as shown in FIG. 10, even when the inner diameter and the center position of the opening 141*a* are different from the design value, by using the droplet ejection device and the droplet ejection method according to the present embodiment, the ejection condition is corrected so as to be optimal, and therefore, a specified amounts of droplets can be ejected at a predetermined position.

Second Embodiment

In the present embodiment, a droplet ejection device different from the first embodiment will be described. Specifically, an example is described in which a new droplet ejection unit is provided in addition to the droplet ejection unit 140. For the sake of explanation, a description of members thereof will be omitted as appropriate.

Figure 11:
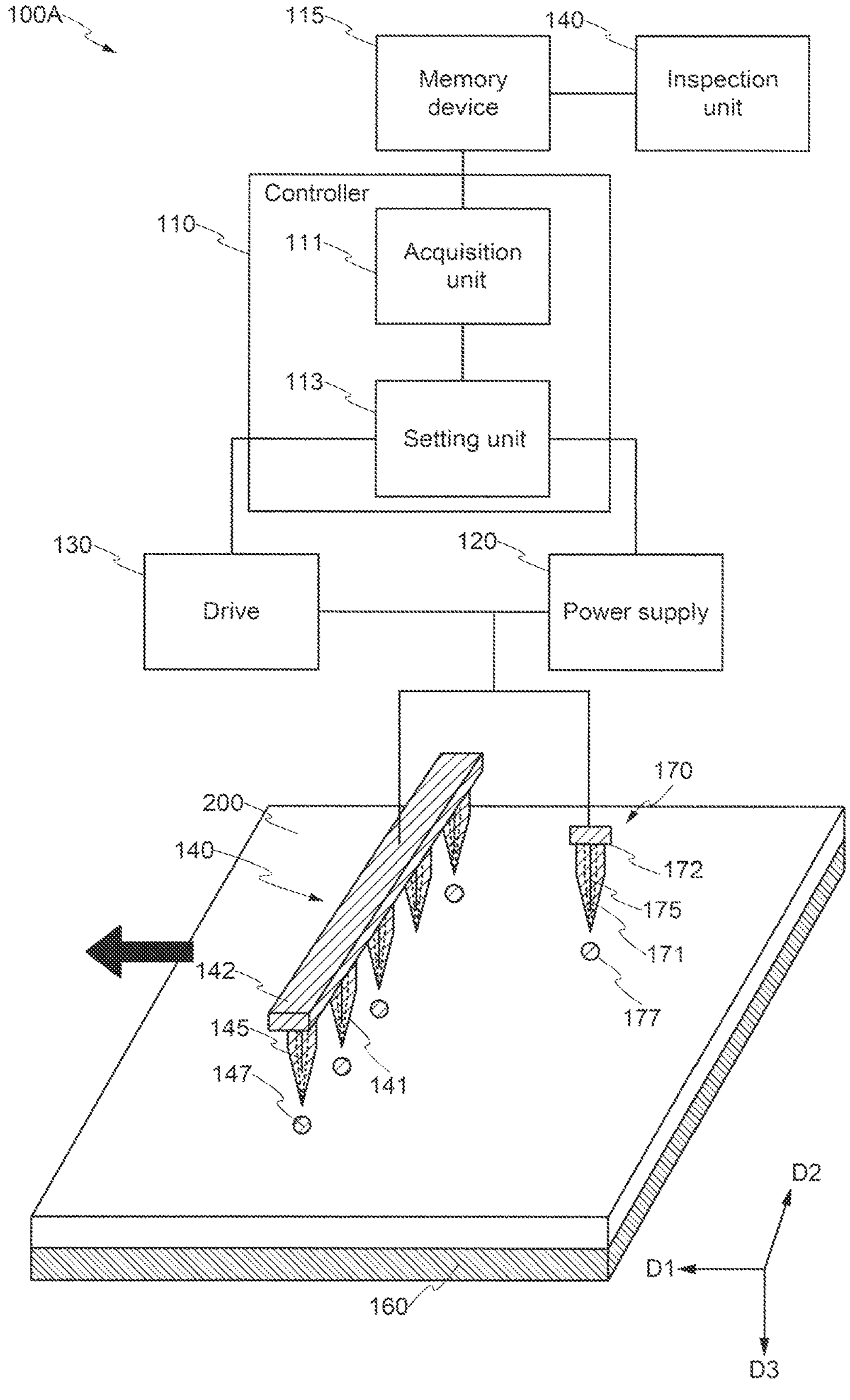
FIG. 11 is a schematic view of a droplet ejection device according to an embodiment of the present disclosure.

FIG. 11 is a schematic view of a droplet ejection device 100A according to an embodiment of the present disclosure. The droplet ejection device 100A includes a second droplet ejection unit 170 in addition to the controller 110, the memory device 115, the power supply 120, the drive 130, the droplet ejection unit 140, the inspection unit 150, and the object holding unit 160.

The second droplet ejection unit 170 is arranged in the opposite direction side to the first direction D1 with respect to the droplet ejection unit 140 (that is, the rear of the droplet ejection unit 140). As shown in FIG. 11, the second droplet ejection unit 170 includes a single nozzle 171 in this example. Specifically, the second droplet ejection unit 170 includes the nozzle 171, a structure 172, and an electrode 175. The second droplet ejection unit 170 may have the same form as the droplet ejection unit 140. The second droplet ejection unit 170 ejects a droplet 177 based on the information of the droplet ejection unit 140 inspected by the inspection unit 150 (specifically, the information of the nozzle 141).

In this example, in the case where the opening of one nozzle 141 among the plurality of nozzles 141 is closed, the droplet 147 is not ejected from the nozzle 141. Therefore, after ejection of the droplet 147 by the droplet ejection unit 140 is completed, the second droplet ejection unit 170 can eject the droplet 177 to a position where the droplet should be ejected by the nozzle 141 where the opening 141*a* has closed.

By using the present embodiment, it is possible to stably eject a droplet at a position where ejection failure occurs.

Third Embodiment

In this embodiment, a droplet ejection device different from the first embodiment and the second embodiment will be described. Specifically, an example is described in which the droplet ejection device does not include an acquisition unit and a setting unit, and an inspection device includes an acquisition unit and a setting unit together with an inspection unit.

Figure 12:
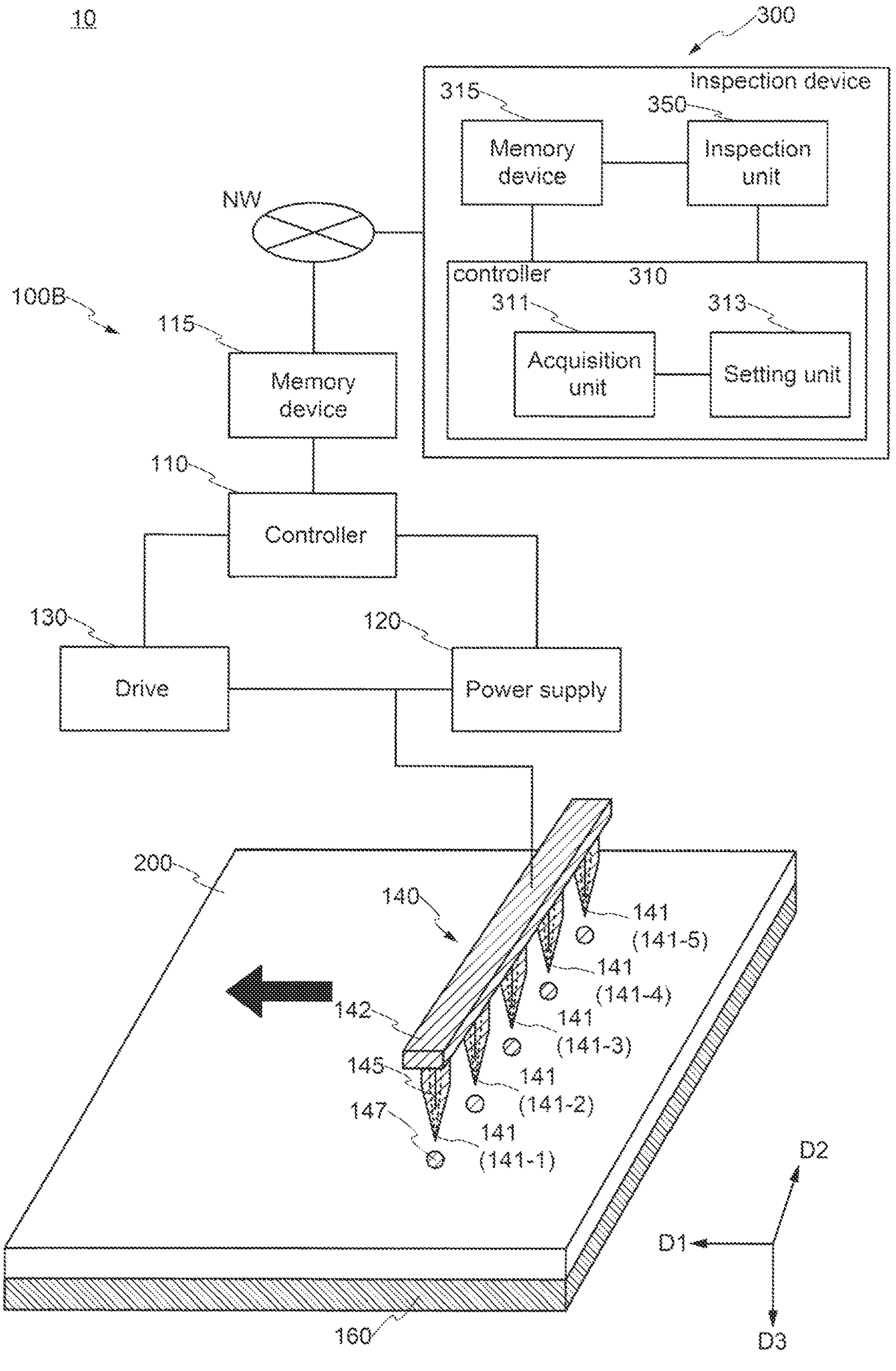
FIG. 12 is a schematic view of a droplet ejection device according to an embodiment of the present disclosure.

FIG. 12 is a schematic view of a droplet ejection system 10 including a droplet ejection device 100B and an inspection device 300 according to an embodiment of the present disclosure. The droplet ejection device 100B includes the controller 110, the memory device 115, the power supply 120, the drive 130, the droplet ejection unit 140, and the object holding unit 160.

The inspection device 300 includes a controller 310, a memory device 315, and an inspection unit 350. The controller 310 includes an acquisition unit 311 and a setting unit 313. The acquisition unit 311 has the same function as the acquisition unit 111. The setting unit 313 has the same function as the setting unit 113.

In the case of the present embodiment, unlike the first embodiment, in the inspection device, the droplet ejection condition can be corrected from a reference value. The information including the droplet ejection condition newly set by correcting thereof is received by the memory device 115 of the droplet ejection device 100B via a network NW. The information including the droplet ejection condition may be stored in a storage medium and connected to the droplet ejection device 100B. By using the present embodiment, the load of the controller 110 on the droplet ejection device 100B can be reduced, and the droplet ejection system can stably eject a droplet at a predetermined position as a whole.

Modifications

Within the spirit of the present disclosure, it is understood that various modifications and changes can be made by those skilled in the art and that these modifications and changes also fall within the scope of the present disclosure. For example, the addition, deletion, or design change of components, or the addition, omission, or condition change of processes as appropriate by those skilled in the art based on each embodiment are also included in the scope of the present disclosure as long as they are provided with the gist of the present disclosure.

In the first embodiment of the present disclosure, although an optical microscope is used as the inspection unit 150, the present disclosure is not limited thereto. For example, a laser microscope, a scanning electron microscope, or the like may be used as the inspection unit 150. The inspection unit 150 may have a form as an imaging device (camera) instead of a form as a microscope.

In the first embodiment of the present disclosure, although an example of inspecting the shape of the opening 141*a* of the nozzle 141 was described, the present disclosure is not limited thereto. For example, the orientation of the tip in the nozzle 141 may be inspected, or the shape of the sides in the nozzle 141 may be inspected.

In the first embodiment of the present disclosure, although an example in which the inspection unit 150 is provided inside the droplet ejection device 100 was described, the present disclosure is not limited thereto. The inspection unit 150 may be provided as a device separate from the droplet ejection device. In this case, the information of the opening 141*a* in the nozzle 141 may be stored in the memory device 115 from the outside of the droplet ejection device 100.

In the first embodiment of the present disclosure, the information of the opening 141*a* of the nozzle 141 may be stored in the inspection unit 150. The acquisition unit 111 may be acquired from the inspection unit 150 via a network.

The information of the opening 141*a* in the nozzle 141 may be stored in an external memory device such as an HDD or an SSD connected thereto, or in a memory device of an external server, in addition to the inspection unit 150.

In the first embodiment of the present disclosure, although an example was shown in which the droplet ejection unit 140 is moved on the object 200 by the drive 130, the present disclosure is not limited thereto. For example, in the droplet ejection device, the drive 130 may move the object 200. In this case, the droplet ejection unit 140 may be fixed at the same position.

In the first embodiment, the object 200 is not limited to a substrate with a flat surface. The object 200 may be a wiring substrate in which wirings are stacked.

In the first embodiment of the present disclosure, although an example was shown of inspecting the opening of the nozzle as the information of the droplet ejection unit, the present disclosure is not limited thereto. For example, the inspection unit 150 may inspect the shape of the droplet when the droplet is ejected to the test substrate in advance before the droplet is ejected to the object 200. In this case, the inspection unit 150 can inspect the size and the amount of misalignment of the droplet when the droplet is ejected at a predetermined position. The information of the droplet ejection unit 140 may be information associated with the shape of the droplet 147. The acquisition unit 111 acquires this ejection result, and the setting unit 113 can set the ejection condition of the droplet from each nozzle 141.

A new second inspection unit different from the inspection unit 150 may be provided. The second inspection unit may be used integrally with the droplet ejection unit 140. After the droplet ejection unit 140 ejects the droplet 147 to the object 200, the second inspection unit may inspect the shape of the droplet ejected from the nozzle 141. The second inspection unit may have an imaging element and may capture an image of the ejection result. The imaging result may be determined by the controller 110. If it is determined that there is an ejection failure, the controller 110 may control to eject the droplet 147 again to the area where the failure occurred. As a result, it is possible to suppress the droplet ejection failure. After the determination of the ejection failure, the second droplet ejection unit 170 may eject a droplet to the area where the ejection failure occurred.

In the first embodiment of the present disclosure, although an example was shown in which the second droplet ejection unit ejects a droplet based on the information of the droplet ejection unit 140, the present disclosure is not limited thereto. As described above, the droplet ejection unit 140 may eject the second droplet based on the first droplet ejection result by the droplet ejection unit 140.

An inspection unit (third inspection unit) different from the inspection unit 150 and the second inspection unit may be provided. The third inspection unit may inspect the surface condition of the object 200, the viscosity of the liquid, and the like. The acquisition unit 111 can acquire this information. The setting unit 113 corrects the ejection condition by comparing the viscosity of the liquid to be used as a reference and the information of the surface condition of the object based on the acquired information. As a result, a new droplet ejection condition can be set.

The invention claimed is:

1. A droplet ejection device comprising:

a first inspection unit configured to inspect a first droplet ejection unit including a plurality of electrostatic ejection type nozzles, the plurality of electrostatic ejection type nozzles configured to move in a first direction with respect to an object and ejecting a first droplet;

a processor; and a memory device configured to store a program, the program being executed by the processor to cause the processor to:

acquire information of the first droplet ejection unit; and set ejection conditions of the first droplet in each of the plurality of nozzles based on the acquired information of the first droplet ejection unit;

a second inspection unit including an image sensor integrally equipped with the first droplet ejection unit, and configured to inspect an ejection result of the first droplet captured by the image sensor in response to the first droplet being ejected onto the object; and a second droplet ejection unit arranged away from the first droplet ejection unit and configured to eject a second droplet according to the inspected ejection result of the first droplet.

2. The droplet ejection device according to claim 1 wherein the first inspection unit is configured to inspect a shape of the nozzles provided in the first droplet ejection unit, and the information of the droplet ejection unit includes information of an opening of a nozzle of the plurality of nozzles.

3. The droplet ejection device according to claim 1, wherein:

the first inspection unit configured is to inspect a shape of the first droplet ejected from the nozzles provided in the first droplet ejection unit; and the information of the first droplet ejection unit includes information associated with the shape of the ejected first droplet.

4. The droplet ejection device according to claim 2, wherein the first droplet ejection unit includes a first nozzle ejecting a third droplet and a second nozzle ejecting a fourth droplet among the plurality of electrostatic ejection type nozzles, the second nozzle being arranged adjacent to the first nozzle in a second direction intersecting the first direction, wherein the first nozzle and the second nozzle are arranged on a structure extending in the second direction.

5. The droplet ejection device according to claim 4, wherein the program causes the processor to set a time to start ejecting the fourth droplet from the second nozzle earlier than a time to start ejecting the third droplet from the first nozzle when a center of an opening of the second nozzle is shifted in the first direction relative to a center of an opening of the first nozzle.

6. The droplet ejection device according to claim 4, wherein the program causes the processor to set a time to eject the fourth droplet from the second nozzle longer than a time to eject the third droplet from the first nozzle when an opening of the second nozzle is smaller than an opening of the first nozzle.

7. The droplet ejection device according to claim 4, wherein the program causes the processor to set a time to start ejecting the fourth droplet from the second nozzle after a time to end ejecting the third droplet from the first nozzle when a center of an opening of the second nozzle is shifted in the second direction relative to a center of an opening of the first nozzle.

8. A droplet ejection method comprising:

inspecting a first droplet ejection unit ejecting a first droplet via a plurality of electrostatic ejection type nozzles, the first droplet ejection unit moving in a first direction with respect to an object;

acquiring information of the inspected first droplet ejection unit;

setting ejection condition of the first droplet based on the acquired information of the first droplet ejection unit;

inspecting an ejection result of the first droplet captured by an image sensor integrally equipped with the first droplet ejection unit in response to the first droplet being ejected onto the object; and ejecting a second droplet via a second droplet ejection unit arranged away from the first droplet ejection unit according to the inspected ejection result of the first droplet.

9. The droplet ejection method according to claim 8, wherein the information of the inspected first droplet ejection unit includes information of an opening of a nozzle provided in the first droplet ejection unit.

10. The droplet ejection method according to claim 8, wherein the information of the inspected first droplet ejection unit includes information associated with a shape of the first droplet ejected from a nozzle provided in the first droplet ejection unit.

11. The droplet ejection method according to claim 9, wherein the plurality of electrostatic ejection type nozzles includes a first nozzle ejecting a third droplet and a second nozzle ejecting a fourth droplet, the second nozzle being arranged adjacent to the first nozzle in a second direction intersecting the first direction, wherein the first nozzle and the second nozzle are arranged on a structure extending in the second direction.

12. The droplet ejection method according to claim 11, further comprising:

setting a time to start ejecting the fourth droplet from the second nozzle earlier than a time to start ejecting the third droplet from the first nozzle when a center of an opening of the second nozzle is shifted in the first direction relative to a center of an opening of the first nozzle.

13. The droplet ejection method according to claim 11, further comprising:

setting a time to eject the fourth droplet from the second nozzle longer than a time to eject the third droplet from the first nozzle when an opening of the second nozzle is smaller than an opening of the first nozzle.

14. The droplet ejection method according to claim 11, further comprising:

setting a time to start ejecting the fourth droplet from the second nozzle after a time to end ejecting the third droplet from the first nozzle when a center of an opening of the second nozzle is shifted in the second direction relative to a center of an opening of the first nozzle.

15. The droplet ejection device according to claim 1, wherein the first inspection unit is configured to inspect the first droplet ejection unit based on an image result captured by the image sensor.

16. The droplet ejection method according to claim 8, wherein the first droplet ejection unit is inspected based on an image result captured by the image sensor.

* * * * *